United States Patent
Jakop et al.

(10) Patent No.: US 10,618,821 B2
(45) Date of Patent: Apr. 14, 2020

(54) OIL WATER SEPARATOR FILTER CARTRIDGE TO HOUSING ENGAGEMENT

(71) Applicant: Ingersoll-Rand Company, Davidson, NC (US)

(72) Inventors: Janez Jakop, Logatec (SI); David Rosenthal, Huntersville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 280 days.

(21) Appl. No.: 15/239,372

(22) Filed: Aug. 17, 2016

(65) Prior Publication Data

US 2018/0050924 A1   Feb. 22, 2018

(51) Int. Cl.
*C02F 1/00* (2006.01)
*B01D 24/00* (2006.01)
(Continued)

(52) U.S. Cl.
CPC ............ *C02F 1/001* (2013.01); *B01D 24/008* (2013.01); *B01D 24/10* (2013.01); *B01D 29/56* (2013.01);
(Continued)

(58) Field of Classification Search
CPC .................. C02F 1/001; C02F 2101/32; C02F 2201/007; B01D 24/007; B01D 24/02;
(Continued)

(56) References Cited

U.S. PATENT DOCUMENTS

| 2,556,292 A | 6/1951 | Newcum |
| 2,992,698 A | 7/1961 | Pearson et al. |

(Continued)

FOREIGN PATENT DOCUMENTS

| CN | 201906509 U | 7/2011 |
| EP | 2730546 A1 | 5/2014 |

OTHER PUBLICATIONS

Extended European Search Report, European Patent Application No. 17183960.8, dated Jan. 25, 2018, 6 pages.
(Continued)

*Primary Examiner* — Liam Royce
(74) *Attorney, Agent, or Firm* — Taft Stettinius & Hollister LLP

(57) ABSTRACT

During the process of compressing air, atmospheric air along with water vapor and airborne contaminants are ingested into the air compressor. Many of these compressors utilize oil for lubrication, sealing and cooling. A compressor system utilizes drain valves to remove the condensate that accumulates in the system which are typically located on the compressor, moisture separators, coalescing filters, receivers, dryers, and drip legs. While the drain valves successfully remove the condensate, this condensate is now contaminated with lubricant. The compressor system also includes a filter for the removal of lubricant from the condensed water so that the water can be discharged to sewer. The filter is arranged to house a series of vertically stacked filter cartridges, each cartridge structured to pass fluid flow to the other cartridge. The housing and the cartridges each having registration surfaces to position the filter within the housing and discourage removal of the same.

6 Claims, 4 Drawing Sheets

(51) Int. Cl.
*B01D 24/10* (2006.01)
*B01D 35/02* (2006.01)
*B01D 29/96* (2006.01)
*B01D 29/56* (2006.01)
*B01D 24/02* (2006.01)
*B01D 35/12* (2006.01)
*C02F 101/32* (2006.01)

(52) U.S. Cl.
CPC ............ *B01D 29/96* (2013.01); *B01D 35/02* (2013.01); *B01D 2201/29* (2013.01); *B01D 2201/30* (2013.01); *B01D 2201/40* (2013.01); *C02F 2101/32* (2013.01); *C02F 2201/007* (2013.01)

(58) Field of Classification Search
CPC ...... B01D 24/008; B01D 24/10; B01D 35/12; B01D 35/02; B01D 29/56; B01D 29/96; B01D 2201/29; B01D 2201/40; B01D 2201/30
See application file for complete search history.

(56) References Cited

U.S. PATENT DOCUMENTS

| | | | |
|---|---|---|---|
| 3,186,148 A | 6/1965 | Merrill et al. | |
| 3,606,737 A | 9/1971 | Lefevre | |
| 3,678,662 A | 7/1972 | Grote | |
| 3,791,105 A | 2/1974 | Rhodes | |
| 4,177,049 A | 12/1979 | Haslett, Jr. | |
| 5,207,895 A | 5/1993 | Basseen et al. | |
| 5,330,723 A | 7/1994 | Martin et al. | |
| 5,401,404 A | 3/1995 | Strauss | |
| 5,622,630 A | 4/1997 | Romano | |
| 7,033,496 B2 | 4/2006 | Thacker et al. | |
| 7,320,725 B2 | 1/2008 | Arno et al. | |
| 7,416,667 B2 | 8/2008 | Benachenou et al. | |
| 8,721,895 B2 | 5/2014 | Benachenou et al. | |
| 2004/0031241 A1 | 2/2004 | Cullen | |
| 2004/0031251 A1 | 2/2004 | Priess | |
| 2005/0252845 A1 | 11/2005 | Kemmelmeyer | |
| 2006/0091059 A1 | 5/2006 | Barbaro et al. | |
| 2007/0023341 A1 | 2/2007 | Bittner | |
| 2008/0087596 A1* | 4/2008 | Bommi | C02F 1/002 210/232 |
| 2011/0006018 A1 | 1/2011 | Ben-Horin et al. | |
| 2012/0039754 A1 | 2/2012 | Alvarado | |
| 2013/0075319 A1* | 3/2013 | Roesgen | B01D 29/21 210/232 |
| 2014/0131289 A1* | 5/2014 | Patera | C02F 5/105 210/767 |
| 2014/0305886 A1* | 10/2014 | Taddei | B01D 29/56 210/797 |
| 2015/0182878 A1 | 7/2015 | Bultinck et al. | |

OTHER PUBLICATIONS

European Patent Office, Examination Report in corresponding application No. 17183960.8, dated Dec. 9, 2019, 4 pp.

* cited by examiner

OIL WATER SEPARATOR FILTER CARTRIDGE TO HOUSING ENGAGEMENT

TECHNICAL FIELD

The present invention generally relates to air compressor system filters, and more particularly, but not exclusively, to filter and housing arrangements for the removal of oil from condensate produced by an air compressor system.

BACKGROUND

Providing filtering systems useful to remove lubricant from condensed water produced by a compressor system remains an area of interest. Some existing systems have various shortcomings relative to certain applications. Accordingly, there remains a need for further contributions in this area.

SUMMARY

One embodiment of the present invention is a unique system for providing flexibility in how many filter cartridges for the removal of oil from air compressor condensate can be used within a given filter housing. Other embodiments include apparatuses, systems, devices, hardware, methods, and combinations for changing the number of filter cartridges through use of a pipe extension. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
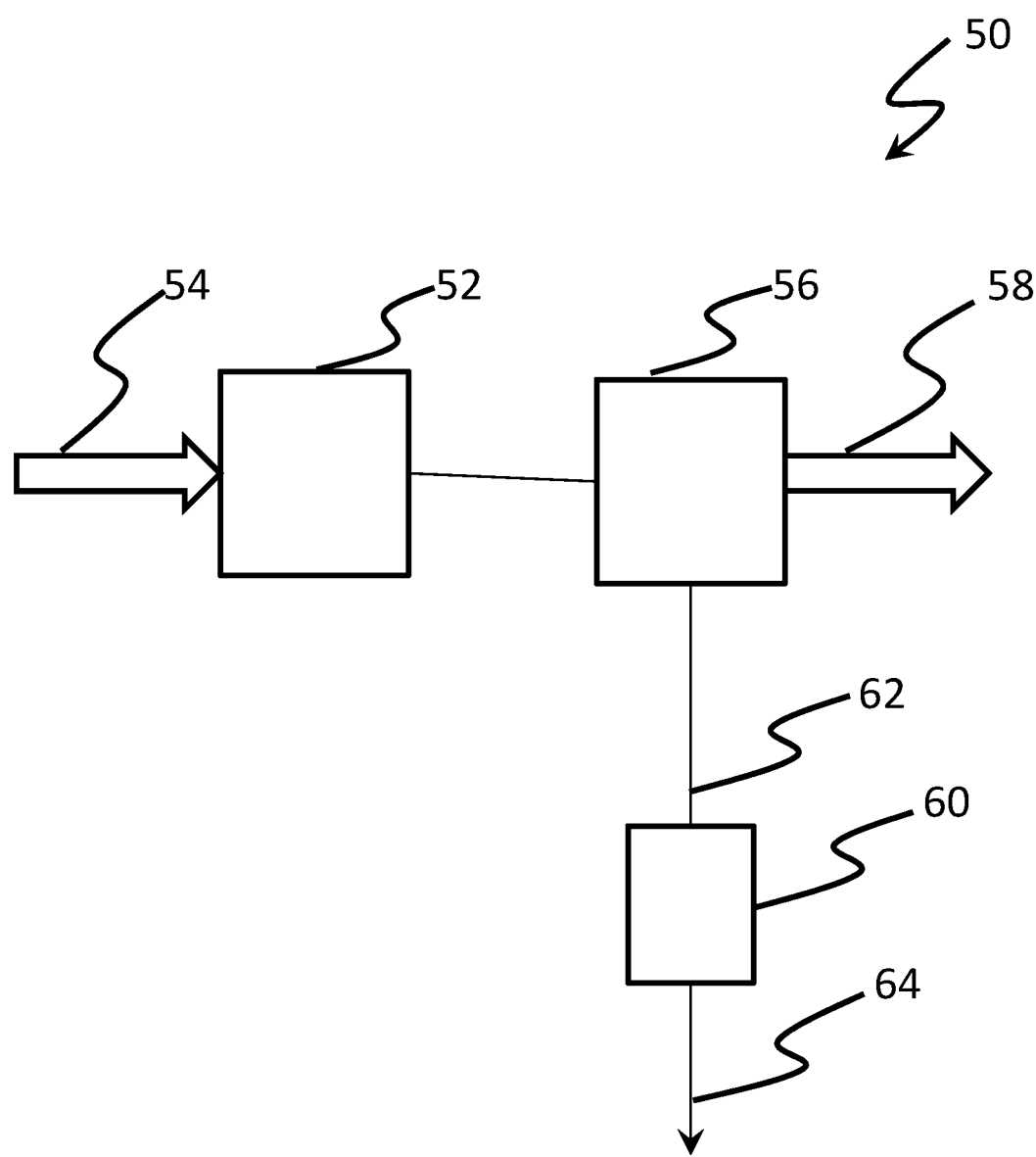
FIG. 1 depicts an embodiment of a compressor system having a filter.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a compressor system 50 is disclosed having a compressor 52 structured to receive and compress a gaseous composition 54 including a target gas (e.g. air) and an undesired vapor (e.g. water vapor). The compressor 52 can take on a variety of forms such as, but not limited to, an oil filled screw compressor, but other forms are also contemplated. The compressor system 50 also includes a dryer 56 configured to condense and remove the undesired vapor from the compressed gaseous composition and thereby form a dried, compressed air 58. The dryer 56 operates by cooling the compressed gaseous composition. In one non-limiting form the dryer 56 is a refrigerated dryer. The dried compressed air can be delivered to an end user, customer, reservoir, or other suitable destination.

The compressor system 50 also includes a condensate filter 60 configured to receive the condensed state of the undesired vapor present in the gaseous composition 54. This condensate filter 60 can receive the condensate water vapor from various locations in the compressor system 50 including the compressor 52, dryer 56, and other liquid collection points. The condensed state of the undesired vapor will typically include a mixture of water and lubricant 62, where the lubricant originates from within the compressor used to seal, cool and lubricate. The filter 60 is structured to remove the lubricant from the condensed water so that cleaned water 64 can be discharged in a municipal sewer system without violating environmental requirements.

Figure 2:
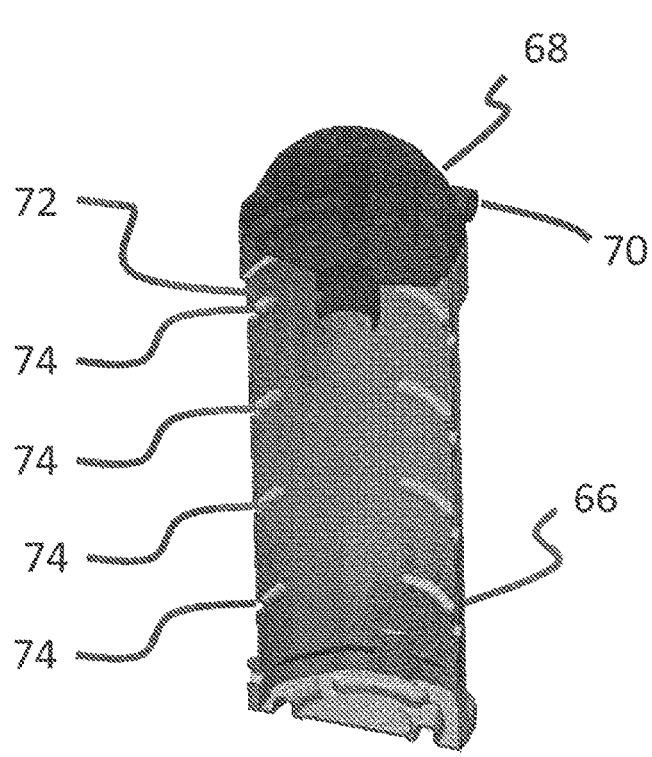
FIG. 2 depicts an embodiment of a filter housing.

The filter 60 generally includes a filter housing, one or more removable filter elements disposed within the housing, and some type of covering to enclose the filter elements. As shown in the exemplary embodiment depicted in FIG. 2, the filter 60 can include a filter housing 66 and a diffuser cap 68. Although the housing 66 (shown in cutaway) is circular in shape, along with the diffuser cap 68, other shapes are contemplated herein.

The diffuser cap is structured to receive the unwanted condensate 62 generated by the compressor system 50 and deliver the unwanted condensate into the interior of the filter housing 66. The diffuser cap 68 includes an inlet 70 and an outlet 72. The diffuser cap can also include a breather port 92 (best seen in FIG. 8) that can include a foam insert and which facilitates air passage, if needed, between atmosphere and the interior of the diffuser cap 68. Although the inlet 70 is shown located on the side of the diffuser cap 68, other locations are also contemplated. The outlet of the diffuser cap 68 can include a projection oriented in a downward direction into the interior of the filter housing 66 as shown in the illustrated embodiment, but other orientations are also contemplated. In some forms the outlet 72 may not include a projection as will be appreciated in the discussion below.

The filter housing 66 is structured to receive the unwanted condensate 62 delivered from the diffuser cap 68 as well as to house a series of stacked filters discussed further below. The housing 66 includes a series of filter positions defined in part by registration surfaces 74. Any number of registration surfaces 74 can be used at any given filter position within the housing 66. Although the registration surfaces are depicted as projections away from an inside surface of the housing 66, other configurations and orientations are also contemplated. In one form the registration surface can be an indentation into the inside surface of the housing 66.

Figure 3:
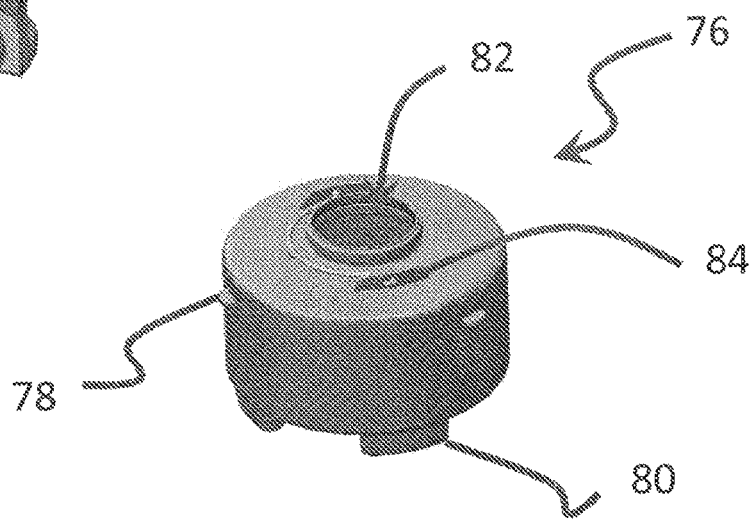
FIG. 3 depicts an embodiment of a filter cartridge.

Turning now to FIG. 3, one embodiment of a filter cartridge 76 suitable for insertion into the filter housing 66 is depicted. The filter cartridge 76 can be made of a molded plastic construction, such as a blown thermoplastic construction, but other techniques are also contemplated herein. The filter can be made out of a variety of materials, whether organic polymers including plastic, or any others suitable for use in a compressor system 50. The filter is structured to house a filter media suitable for removing lubricant from the unwanted condensate 62. In one form the lubricant can be polyalkaline glycol, or a glycol and ester mixture, but other lubricant types are also possible. Suitable filter media for compressor system 50 application include zeolite rocks distributed into the interior of the filter cartridge 76, but other filter media is also contemplated. In many applications any suitable type of filter media are contemplated. To set forth a broad category of possible filter media, oleophillic media can be used in the cartridge. Such media include, but are not limited to: zeolite, carbon, coalescing foam, polypropylene, and compositions such as polytetrafluorethylene (e.g. Teflon). In these embodiments a screen can optionally be used and located at the bottom of the filter cartridge to provide a barrier for egress of the filter media.

Though the filter cartridge 76 can take a variety of forms, the illustrated embodiment includes a registration surface 78 structured to be placed in cooperative engagement with the registration surface 74 of the filter housing 66. Any number of registration surfaces 78 can be used and located in any variety of locations, and can take on any shape and size. In one form the registration surface can extend along a line that is orthogonal to a line connecting the center points of the filter cartridge inlet and outlet. Although the registration surfaces 78 project away from the cartridge housing to form a ridge in the illustrated embodiment, any shape and orientation are also contemplated herein that achieve the effect of locating the cartridge 76 into a position within the housing 66 and, when engaged with the registration surface 74 of the housing 66, discourage removal of the cartridge 76 from the housing 66. The registration surface in the illustrated embodiment can circumferentially extend any variety of amounts. To set forth just a few non-limiting examples, the registration surfaces 78 circumferentially extend less than 45 degrees, less than 30 degrees, less than 20 degrees, less than 15 degrees, less than 10 degrees, or less than 5 degrees.

The filter cartridge 76 can also include feet 80, inlet 82, and a handle for removal (the handle in the illustrated embodiment curves around the inlet 82 and are attached through pivoting arrangement to the upright handle supports 84). Not all embodiments need include feet 80 and/or the handles for removal 84. The feet can be used to support the cartridge 76 into position within the housing 66, either by contact with the housing 76 (or is component parts), or by contact with an adjacent filter cartridge 76 also located in the housing 66. The feet 80 can be molded in to the cartridge housing, but in other forms the feet can be affixed to it. Any number of feet 80 can be used. The inlet 82 can be connected to the outlet 72 of the diffuser cap 68, but in other forms the inlet 82 can be connected to other components as will be appreciated in the discussion below. Though the inlet 82 is depicted as a projection, some embodiments need not include a projection away from the cartridge 76. For example, the registration surface 78 can be formed as an indentation into the cartridge 76.

Although not depicted in the image, the filter cartridge 76 includes an exit at the bottom of the cartridge (which can be seen in the figures below). The exit is sized to engage an inlet 82 of an adjacent (albeit located below) cartridge 76 to form a fluid path from one cartridge 76 to the next. The inlet 82 and exits can thus be shaped to complement one another, and in this respect the cartridges can be interchangeable between each other (i.e. the inlet of one can fit the outlet of the other, and vice versa the outlet of the one can fit the inlet of the other). The inlets 82 and outlets can be circular in shape. The center point of each circular inlet can be arranged along a line that is parallel with an external cylindrical surface in those embodiments having a cylindrical exterior. In one form the fit between inlets and outlets of the cartridges 76 can be made by slideable insertion. Additionally and/or alternatively, the fit can be a slip fit. In one form the fit is non-threaded.

The filter cartridge 76 can be inserted into the housing 66 by first removing the diffuser cap 68, orienting the filter cartridge 76 such that the registration surface 78 does not interfere with the registration surface 74 of the housing 66, and sliding the cartridges 76 into place. Once the cartridge 76 is located in a cartridge position, the cartridge 76 can be rotated to engage the registration surfaces 74 and 78. In one non-limiting form the cartridge 76 can be rotated approximately 60 degrees to ensure appropriate engagement, although it is contemplated that other angles can also be used. In some forms suitable rotations include angles less than 360 degrees, such as but not limited to less than 270 degrees, 180 degrees, 90 degrees, or 40 degrees, to set forth just a few examples. In some form the surfaces 74 and 76 can be parallel with one another, while in others the surfaces 74 and 76 can be angled such that a progressive interference is created by further rotation of the cartridge 76. Although not depicted, a stop may be formed into one or both of the cartridge 76 and housing 66 to halt further rotation of the cartridge 76.

Figures 4, 5:
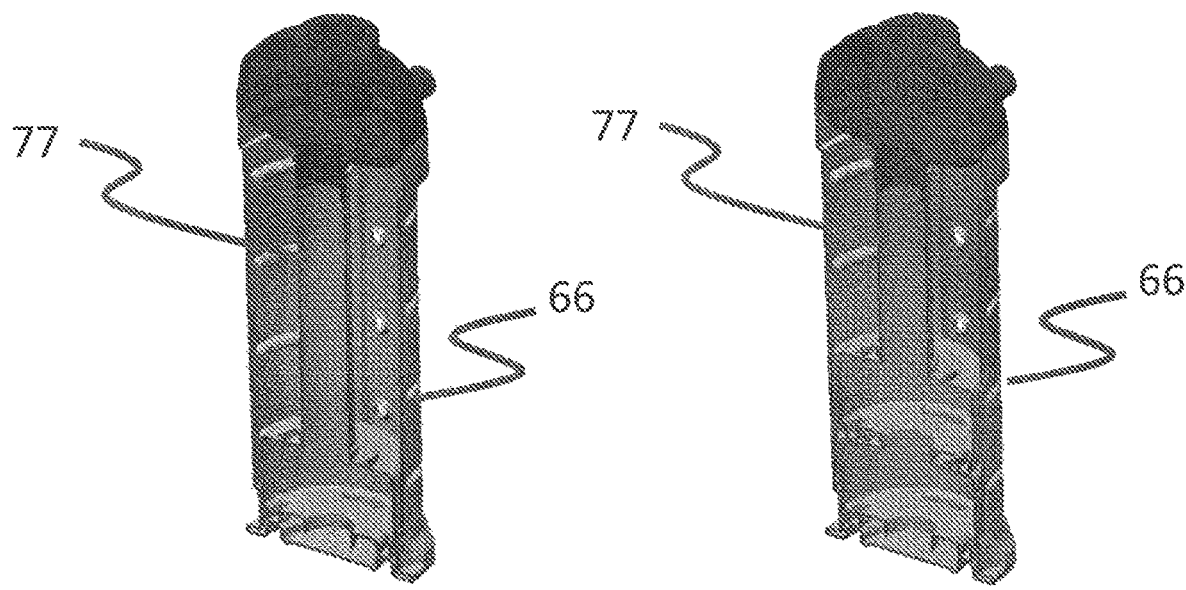
FIG. 4 depicts an embodiment of a filter housing having a single filter cartridge.
FIG. 5 depicts an embodiment of a filter housing having two filter cartridges.
Figures 6, 7:
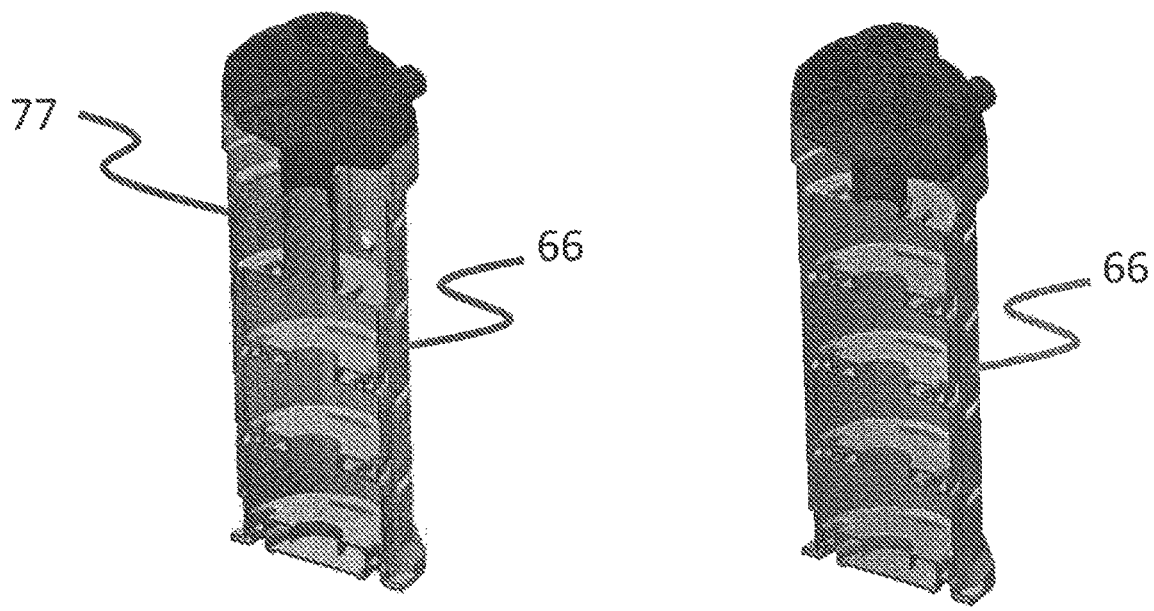
FIG. 6 depicts an embodiment of a filter housing having three filter cartridges.
FIG. 7 depicts an embodiment of a filter housing having four filter cartridges.

Turning now FIGS. 4-7, various numbers of cartridges 76 can be used within the filter housing 66, some of which further include a pipe extension 77. The pipe extension 77 is used to connect the diffuser cap 68 to the upper most cartridge 76 in the vertically stacked set of cartridges 76. In one form the connection between the extension 77 and either or both of the outlet 72 and inlet 82 can be a slip fit that, in some forms, is fluid tight. The fit can be non-threaded. The embodiment in FIG. 4 depicts a single cartridge 76, the embodiment in FIG. 5 depicts two cartridges 76, the embodiment in FIG. 6 depicts three cartridges 76, and the embodiment in FIG. 7 depicts four cartridges 76.

The number of cartridges 76 can be sized according to the needs of any given compressor system 50 application. High volume compressors may use more filter cartridges 76 than low volume compressors. It is contemplated in one form that each cartridge can be suitable for 100 cfm air flow.

The pipe extension 77 can include an inlet and outlet having the same size, such that it does not matter which direction it is oriented to connect the cap 68 to the upper most cartridge 76 (at least in those embodiments where in the outlet 72 is sized similarly to the inlet 82). The sizes of the pipe extensions 77 are different in the various embodiments which reflect the different number of cartridges used in the embodiment. In FIG. 7 a pipe extension 77 is not used, but in other embodiments a shortened pipe extension 77 could be used where the projection from either or both the cartridge 76 and cap 68 are not present.

Similar to when the filter cartridges 76 are serviced by rotating the cartridge 76 to clear registration surfaces 74, slidingly inserting and then rotating the cartridges 76 to lock in place, the filter housing 66 can continue to be used when a customer changes total compressed air flow such as adding a compressor or upgrading to a higher capacity compressor. In such an application the user need only change the number of filter cartridges 76 present in the housing 66, exchange the pipe extension 77 for a different length pipe extension 77 (if needed), re-install the diffuser cap 68, and begin operating with the new compressor.

Figure 8:
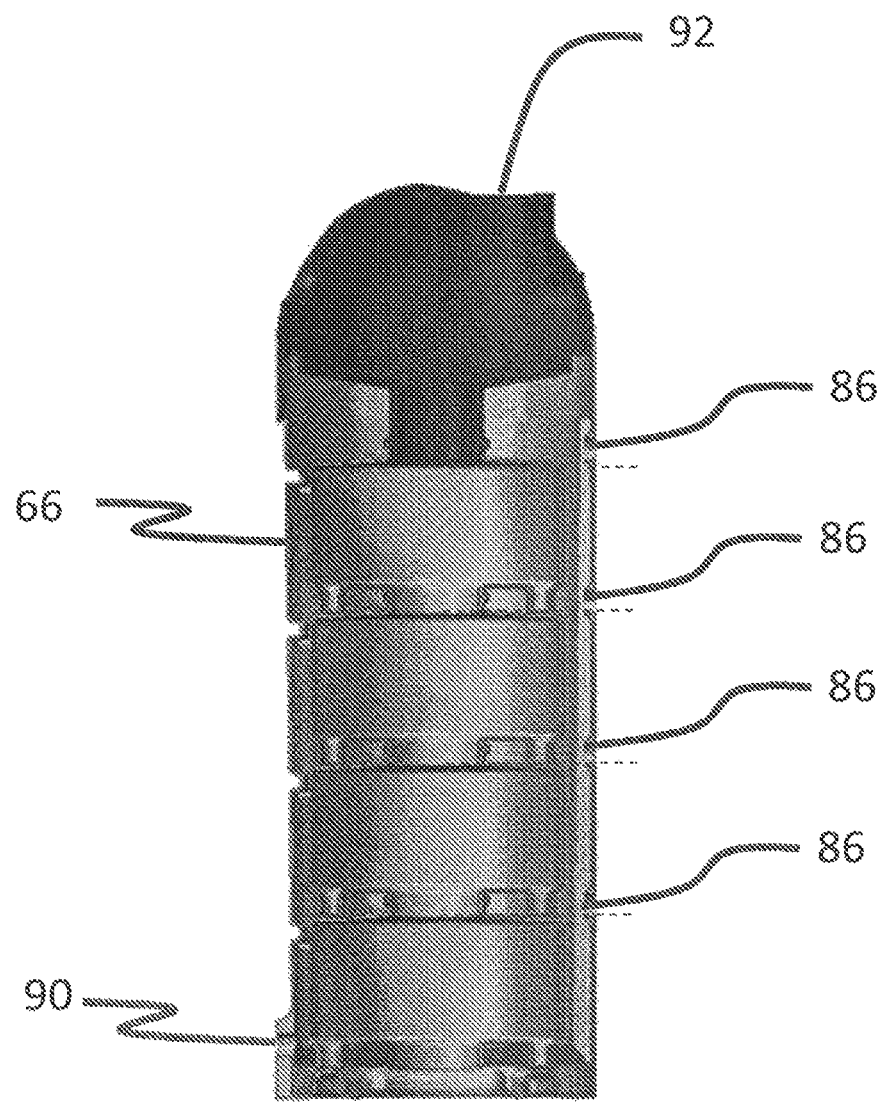
FIG. 8 depicts an embodiment of a filter housing having several housing outlets.

Turning now to FIG. 8, a cutaway view is shown of a filter housing 66 that includes four filter cartridges 76. The housing 66 is further shown having a number of fluid flow outlets 86. The outlets 86 are arranged to coincide with each of the filter cartridges 76, and are placed in proximity to the top of each cartridge 76 (marked as a dashed line in the figure). In one form the outlets 86 include a centerline that coincides with the top of each cartridge, but such strict correlation is not needed in all embodiments.

The housing outlets 86 can be selectively covered such as through a threaded cover, but other cover types are also contemplated. It is envisioned that only one housing outlet 86 need be opened at any given time, the outlet 86 of which corresponds to the top most cartridge 76 in the stack. For example, if only one cartridge 76 were used it is envisioned that the bottom most housing opening 86 would be uncovered, while the other three remain closed by the cover. If two cartridges are used, the second cartridge 76 from the bottom would have its housing outlet 86 uncovered while the other three remain closed by the cover. And so on for the other cartridges.

An optional drain outlet 90 can be provided in the housing 66. Such a drain 90 can be located at the bottom and is useful for vacuuming liquid from within housing 66 during servicing. The drain 90 can, but need not, be covered in the same manner as the housing outlets 88.

Also of note in FIG. 8, the feet 80 of each cartridge 76 are shown engaged with a cartridge below. Such engagement is suitable to provide a mechanical stop to halt further coupling between the adjacent cartridges 76. Also of note, the bottom most cartridge 76 is shown in which its feet 80 are engaged with a standoff placed in the bottom of the housing 66. Such an arrangement can be included in any given embodiment to provide a flow path for the filtered water to exit the bottom cartridge 76 and begin to flow to the outlet. The housing 66 can include a well located intermediate the standoffs formed in the bottom which engage the feet 80 of the bottom cartridge, but not all embodiments need include such a shape.

One aspect of the present application provides an apparatus comprising a filter cartridge including an inlet and an outlet as well as an impermeable outer casing structured that extends between the inlet and outlet to provide an internal space for an internal filtering media, the outlet structured to be complementarily engaged during operation of the filter cartridge with an inlet of a neighboring filter cartridge having the same configuration such that the complementary engagement provides a liquid flow path between the cartridges, the outer casing including a registration surface that extends less than 360 degrees around the casing, the registration surface structured to be engaged with a complementary registration surface in a filter housing such that the engagement discourages removal of the filter cartridge from the housing.

A feature of the present application provides wherein the inlet includes a tubular opening that extends away from a main body of the filter cartridge.

Another feature of the present application provides wherein the registration surface is a protrusion that extends away from the outer casing.

Still another feature of the present application provides wherein the registration surface extends along a line at a right angle to a line between the inlet and outlet.

Yet another feature of the present application provides wherein the outer casing of the filter cartridge includes an organic polymer material, and wherein the filter cartridge further includes zeolite rock as a filtering media disposed internal to the filter cartridge.

Yet still another feature of the present application provides wherein the filter cartridge includes a bottom surface from which extends a foot structured to support the filter cartridge.

Still yet another feature of the present application provides wherein the foot is structured to abut the neighboring filter cartridge when the inlet and outlet are engaged with one another.

Another aspect of the present application provides an apparatus comprising a liquid water filter cartridge having an inlet for receipt of a water and lubricant mixture as well as an outlet structured to pass a filtered water, the inlet and outlet being complementarily shaped such that when an inlet of a the liquid water filter cartridge is engaged with an outlet of an adjacent liquid filter cartridge during operation of the liquid water filter cartridge a liquid flow path is formed, the liquid filter cartridge also including a main body extending between the inlet and outlet, the main body including a non-threaded registration surface that extends less than the entire lateral periphery of the filter cartridge, the non-threaded registration surface configured to engage with an interior surface of a filter housing in which the liquid water filter cartridge can be disposed to lock the filter in place in the housing.

A feature of the present application provides wherein the registration surface is a ridge formed in the outer casing of the filter cartridge that circumferentially extends less than 20 degrees.

Another feature of the present application provides wherein the liquid water filter cartridge further includes a foot extending from a bottom of the cartridge.

Still another feature of the present application includes a filter media disposed within the main body.

Yet another feature of the present application provides wherein the filter media is a zeolite rock material.

Still yet another feature of the present application includes the filter housing, and wherein the liquid water filter cartridge can be locked into place by rotating the cartridge relative to the housing through a rotation angle about an axis that extends between the inlet and outlet, the rotation angle less than 180 degrees.

Yet still another feature of the present application includes a plurality of protrusions, and wherein the liquid water filter cartridge is configured to be rotated less than 180 degrees to be locked into place when installed in the filter housing.

Yet another aspect of the present application provides an apparatus comprising a filter cartridge having a main body disposed between complementary shaped inlet and outlet and in which is disposed a zeolite rock filter media, the liquid filter cartridge also including a main body extending between the inlet and outlet and having a registration surface extending from the main body structured to cooperate with a complementary registration surface formed on an interior surface within a filter housing where such cooperation discourages removal of the filter cartridge from the filter housing when the complementary registration surfaces are interengaged, the filter cartridge also including feet formed in the main body and used to abut an adjacent filter cartridge when stacked upon one another.

A feature of the present application provides wherein the inlet is shaped such that it can be slidingly received in an outlet of the adjacent cartridge.

Another feature of the present application provides wherein the registration surface of the filter cartridge extends less than 20 degrees over the periphery of the main body.

Still another feature of the present application provides wherein the registration surface of the filter cartridge is an externally extending ridge.

Yet another feature of the present application provides wherein the main body is a molded plastic shell.

Yet still another feature of the present application further includes the adjacent cartridge and the filter housing within which is disposed the cartridge and adjacent cartridge.

Yet still another feature of the present application provides an apparatus comprising a filter housing having an opening for the receipt of water-lubricant mixture and having an open interior into which can be placed a series of vertically stacked filter cartridges, the filter housing having plurality of vertically spaced outlets corresponding to each filter in the series of vertically stacked filter cartridges such as to create a vertically stacked pairing of outlets and cartridges, each of the vertically spaced outlets in the pairing of outlets and cartridges positioned in proximity to a top of the cartridge that corresponds to the vertically spaced outlet in the pairing, the vertically spaced outlets configured to be selectively opened from a closed state by removal of a threaded cover that closes the vertically spaced outlets.

A feature of the present application provides wherein the housing includes vertically spaced internal registration surfaces useful to locate each filter cartridge of the series of vertically spaced filter cartridges.

Another feature of the present application provides wherein a fluid flow path is provided from a bottom of the filter housing, along an interior wall of the filter housing, and exiting through an opened outlet of the vertically spaced outlets.

Still another feature of the present application further includes a well at the bottom of the housing.

Yet another feature of the present application provides wherein each of the vertically spaced outlets include a centerline that coincides with a top surface of each of the corresponding filter cartridge in the series of vertically spaced filter cartridges.

Yet still another feature of the present application further includes a diffuser cap situated at a top of the housing.

Still yet another feature of the present application further includes the series of vertically spaced filter cartridges.

Still yet another aspect of the present application provides an apparatus comprising a filter housing assembly that includes a filter housing and diffuser cap, the diffuser cap structured to be positioned atop the housing and including an inlet for the receipt of water and lubricant mixture and an outlet that provides the mixture to the filter housing, the filter housing having an internal surface that includes plurality of internal registration surfaces distributed along a height of the internal surface and structured to permit insertion of a plurality of filter cartridges stacked upon and in fluid communication with one another when the plurality of filter cartridges are oriented in an insertion position, the plurality of internal registration surfaces also structured to discourage removal of the plurality of filter cartridges when the plurality of filter cartridges are oriented in a locked position.

A feature of the present application provides wherein the plurality of internal registration surfaces are protrusions that extend into an internal space defined by the filter housing.

Another feature of the present application provides wherein the plurality of internal registration surfaces are equally spaced from one another along the height of the internal surface.

Still another feature of the present application provides wherein the internal registration surfaces distributed along the height include a plurality of registration surfaces at the same height.

Yet another feature of the present application provides wherein the internal surface is cylindrical in shape.

Yet still another feature of the present application provides wherein the filter housing includes a well at the bottom defined between standoffs to collect filtered water.

Still yet another feature of the present application provides wherein the filter housing includes a plurality of exit passages distributed along the height of the internal surface.

Still yet another aspect of the present application provides an apparatus comprising a filter housing structured to contain a plurality of individual filter canisters that when installed are stacked upon one another and are capable of filtering lubricant from water, the filter housing having a plurality of filter positions each defined by at least one registration surface that correspond with each separate filter position of the plurality of filter positions, each of the at least one registration surface vertically spaced from one another and configured to engage a filter located at a filter position when installed in the filter housing, the filter housing also including a series of vertically spaced outlets where each outlet corresponds to each of the separate filter positions, the vertically spaced outlets structured to selectively receive a removable outlet plug.

A feature of the present application provides wherein the registration surfaces acts to urge the filter cartridges in a downward direction when the filter cartridges are installed at their separate filter positions.

Another feature of the present application provides wherein each filter position includes a plurality of registration surfaces.

Still another feature of the present application provides wherein the registration surfaces extend from an inner surface of the filter housing.

Yet another feature of the present application provides wherein the removable outlet plug is a threaded plug.

Yet still another feature of the present application provides wherein each of the vertically spaced outlets have a centerline that intersects a top of the respective filter cartridge when installed in the respective filter position.

Still yet another feature of the present application provides wherein the filter housing also includes a drain discharge port located at the bottom of the housing beneath all of the vertically spaced outlets.

An aspect of the present application provides an apparatus comprising a filter housing having an inner surface that forms an open interior into which can be inserted a plurality of filter cartridges, the inner surface having a plurality of vertically spaced registration surfaces suitable for receiving the plurality of filter cartridges and affixing the filter cartridges a vertical filtering position, the filter housing also having a plurality of vertically spaced outlet ports in which at least one outlet port is opened and at least another outlet port is closed, at least one filter cartridge disposed within the filter housing, the at least one filter cartridge having a registration surface rotated to engage the registration surface of the filter housing, the engagement of the at least one filter cartridge registration surface and the filter housing registration surface structured to discourage removal of the filter cartridge as well as seat the filter cartridge in place to form a fluid flow path of the filter housing, and a removable outlet port plug covering the at least another outlet port.

A feature of the present application provides further includes a plurality of pipe extensions of a plurality of different lengths.

Another feature of the present application provides wherein the at least one filter cartridge includes feet.

Still another feature of the present application further includes a pipe extension positioned between the diffuser cap and the at least one filter cartridge.

Yet another feature of the present application further includes an additional filter cartridge.

Yet still another feature of the present application provides wherein the at least one filter cartridge includes a ridge shaped registration surface.

Still yet another feature of the present application provides wherein the at least one filter cartridge includes zeolite rock filtering media, and wherein the at least one filter cartridge is made of an organic polymer.

Still another aspect of the present application provides an apparatus comprising a kit including a filter housing, a first filter cartridge, and a pipe extension, wherein: the filter housing including a plurality of registration surfaces arranged vertically within an open interior of the filter housing, the filter housing also including a plurality of outlet ports arranged vertically along an exterior of the filter housing; the first filter cartridge including a registration surface structured to cooperate with the registration surface of the filter housing such that when the first filter cartridge is inserted and rotated into place the cooperative engagement of the filter housing registration surface and the first filter cartridge registration surface discourage removal of the first filter cartridge; and the pipe extension including a first end structured to engage the diffuser cap and a second end structured to engage the first filter cartridge, the pipe extension forming a fluid flow path from the diffuser cap to the first filter cartridge.

A feature of the present application further includes a second filter cartridge having a registration surface, as well as an inlet and an outlet, the inlet of the second filter cartridge configured to be received by the outlet of the filter cartridge.

Another feature of the present application provides wherein the first end of the pipe extension is identical to the second end of the pipe extension.

Still another feature of the present application provides wherein the first end of the pipe extension is structured for sliding engagement with the diffuser cap, and the second end of the pipe extension is structured for sliding engagement with an inlet of the first filter cartridge.

Yet another feature of the present application provides wherein the plurality of registration surfaces of the filter housing are formed as protrusions into an interior of the filter housing, and the registration surface of the first filter cartridge circumferentially extends over less than 45 degrees.

Yet still another feature of the present application provides the registration surface of the first filter cartridge circumferentially extends over less than 20 degrees.

Yet still another aspect of the present application provides a method comprising removing a diffuser cap from a filter housing that contains at least one filter cartridge among several possible filter cartridges configured to be stacked upon one another, the diffuser cap structured to be in liquid communication with a condensate drain of an air compressor system, performing one of a reducing the number of filter cartridges present in the housing or adding an additional filter cartridge to the housing, and inserting a new pipe extension into the housing to connect the diffuser cap with a top filter cartridge present in the filter housing.

A feature of the present application provides wherein the new pipe extension is a fresh pipe extension of different length than a previous pipe extension used in the filter housing.

Another feature of the present application further includes draining residual fluid from within the filter housing during a servicing of the filter cartridges.

Still another feature of the present application provides wherein the filter housing includes a plurality of port outlets for the discharge of filtered water, and which further includes covering an outlet plug on a first port outlet, and removing an outlet plug on a second port outlet.

Yet another feature of the present application provides wherein the covering includes installing the outlet plug from the second port outlet on to the first port outlet.

Yet still another feature of the present application provides wherein the at least one filter cartridge is made of organic polymer.

Still yet another feature of the present application provides wherein the at least one filter cartridge includes a zeolite rock filter media.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
a filter cartridge including an inlet and an outlet as well as an impermeable outer casing structured that extends between the inlet and outlet to provide an internal space for an internal filtering media, the outlet structured to be complementarily engaged during operation of the filter cartridge with an inlet of a neighboring filter cartridge having the same configuration such that the complementary engagement provides a liquid flow path between the cartridges and the cartridges are interchangeable with one another, the outer casing including a registration surface that extends less than 360 degrees around the casing, the registration surface structured to be engaged with a complementary registration surface in a filter housing such that the engagement discourages removal of the filter cartridge from the housing;
wherein the filter cartridge includes a bottom surface from which extends a foot structured to support the filter cartridge.

2. The apparatus of claim 1, wherein the inlet includes a tubular opening that extends away from a main body of the filter cartridge.

3. The apparatus of claim 1, wherein the registration surface is a protrusion that extends away from the outer casing.

4. The apparatus of claim 3, wherein the registration surface extends along a line at a right angle to a line between the inlet and outlet.

5. The apparatus of claim 4, wherein the outer casing of the filter cartridge includes an organic polymer material, and wherein the filter cartridge further includes zeolite rock as a filtering media disposed internal to the filter cartridge.

6. The apparatus of claim 4, wherein the foot is structured to abut the neighboring filter cartridge when the inlet and outlet are engaged with one another, and wherein the filter media is an oleophillic media.

* * * * *